United States Patent [19]

Tseng et al.

[11] Patent Number: 5,236,643
[45] Date of Patent: Aug. 17, 1993

[54] PREPARATION OF GAS SEPARATION MEMBRANE AND SPIRAL WOUND GAS SEPARATION MODULE

[75] Inventors: Tsai-Wie Tseng, Taiwan-Hsinchu; Yih-Her Chang; Juh-Shyong Lee, both of Hsinchu; Shyh-Yeu Wang, Chung-Li; Woei-Ling Lin; Ren-Kuen Chang, both of Hsinchu, all of Taiwan

[73] Assignee: Industrial Technology Research Institute, Taiwan

[21] Appl. No.: 758,417

[22] Filed: Sep. 4, 1991

Related U.S. Application Data

[63] Continuation of Ser. No. 480,130, Feb. 14, 1990.

[51] Int. Cl.$^5$ .............................................. B29C 67/20
[52] U.S. Cl. ..................... 264/41; 264/45.8; 264/87; 264/171; 264/216; 264/232
[58] Field of Search ............ 264/216, 41, 45.8, 45.1, 264/87, 232, 233, 340, 171; 55/16

[56] References Cited

U.S. PATENT DOCUMENTS

| | | | |
|---|---|---|---|
| 3,432,584 | 3/1969 | Cannon et al. | 264/216 |
| 3,497,072 | 2/1970 | Cannon | 210/500.3 |
| 3,842,020 | 10/1974 | Garrett | 264/41 |
| 4,080,743 | 3/1978 | Manos | 210/500.27 |
| 4,134,742 | 1/1979 | Sohell | 210/490 |
| 4,430,807 | 2/1984 | Davis et al. | 55/16 |

Primary Examiner—Leo B. Tentoni
Attorney, Agent, or Firm—Cushman, Darby & Cushman

[57] ABSTRACT

The invention relates to a process for preparing gas separation membranes or modules. Membrane forming material is cast into a wet membrane which is wound into a spiral module. The spiral module is arranged in a closed circulating apparatus. Exchanging solvents or treating solutions are circulated through the circulating apparatus and the spiral module for an appropriate period of time. The module and circulating apparatus are purged until the membrane is dry, thus producing a gas separation membrane or module.

32 Claims, 6 Drawing Sheets

PREPARATION OF GAS SEPARATION MEMBRANE AND SPIRAL WOUND GAS SEPARATION MODULE

This is a continuation of application Ser. No. 07/480,130, filed on Feb. 14, 1990, which was abandoned upon the filing hereof.

BACKGROUND OF THE INVENTION

The invention relates to a process for preparing gas separation membranes and modules. Gas separation membranes are films which exhibit a higher permeability toward some gases than toward others. Industries increasingly employ such membranes for such uses as: oxygen enrichment of air, purification of nitrogen, recovery of hydrogen from hydrogen reaction systems, removal of acid gases from natural gas or biogas, and separation of acid gases ($CO_2$, $H_2S$).

Such membranes have no moving parts, negligible maintenance, low energy requirements, operational flexibility, and rapid start up and shut down. They may be formed as flat sheets, hollow fibers or tubes. A reinforcing fabric of woven or nonwoven polyester, or nylon increases membrane strength, improves operational properties and provides longer life.

The rate at which gas permeates a membrane can be expressed as p/l, where p is the gas permeability, and l is the effective membrane thickness. Cellulose acetate exhibits particular commercial importance because its effective thickness is about 0.1 micrometers. This in turn, results in a relatively high gas permeation rate.

Cloth reinforced membranes have been prepared by casting a cellulose acetate solution on the cloth and then gelling, leaching, annealing, solvent exchanging and drying the cloth/membrane combination. Cannon U.S. Pat. No. 3,497,072 discloses a phase inversion technique for casting a cellulose acetate membrane. If a wet membrane is to be dried directly, the high surface tension of water will destroy the microporous structure. Drying methods which can prevent this destruction include (1) freeze drying; (2) adding an agent to reduce surface tension; and (3) exchanging the water solvent for another solvent. McDonald et al U.S. Pat. No. 3,842,515 describes a solvent exchanging process which exchanges water with water missible alcohol, then exchanges the alcohol with a nonpolar organic solvent, and finally evaporates the nonpolar organic solvent to leave a dried membrane. Manos U.S. Pat. No. 4,080,743 describes a solvent exchanging process which first exchanges water with water missible organic solvents, and then evaporates the mixture to leave a dried membrane.

During the step of drying, different shrinkage ratios between the cellulose acetate membrane and the reinforcing cloth causes curling, wrinkling and cracking. Moreover, brittle membranes sometimes crack during winding into spiral wound modules. Schell U.S. Pat. No. 4,134,742 discusses these problems and attempts to reduce curling by utilizing a reinforcing cloth having a shrinkage ratio close to that of the membrane. This approach does not solve problems caused by uneven shrinking between the membrane in the reinforcing cloth, nor does it reduce cracking problems when winding a dried membrane into a spiral wound module.

SUMMARY OF THE INVENTION

A process for forming gas separation membranes and spiral wound gas separation modules avoids shrinking and curling by winding wet membrane onto a core before drying. The spiral wound wet membrane is placed in a treating container, and treating solutions for solvent exchange are circulated through the container and membrane. After solvent exchange, the spiral wound membrane is dried.

DETAILED DESCRIPTION OF THE PREFERRED EMBODIMENTS

The invention is a process for producing a gas separation membrane and module. Materials used for industrial gas separation membrane applications include cellulose acetate (CA), polysulfone, polyamide, polyimide, polycarbonate, polysiloxanes, poly (4-methyl-1-pentene), poly (phenylene oxide) and poly (vinylidene fluoride).

Figure 1:
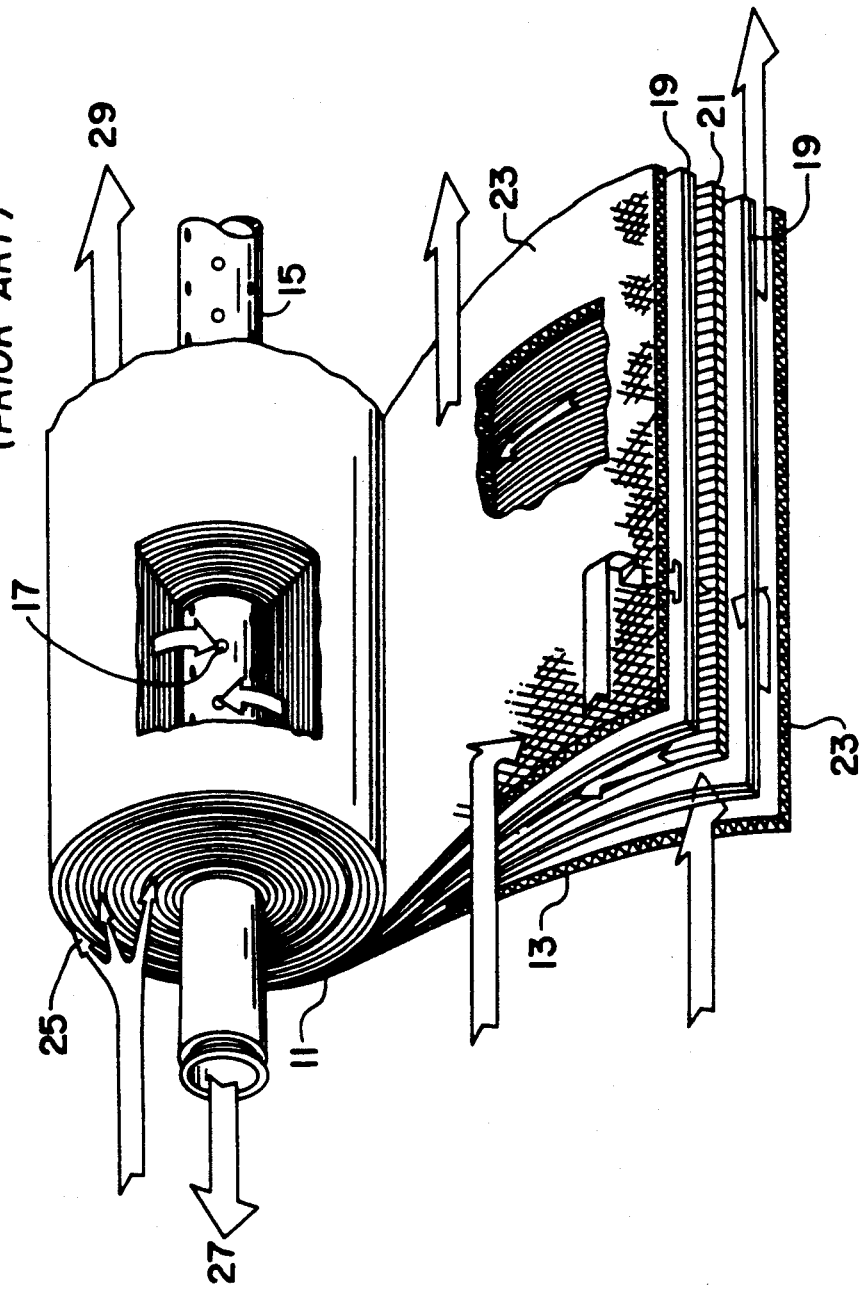
FIG. 1 is a partially cut-away view of a spiral wound gas separation membrane.

FIG. 1 shows an example of such a spiral wound gas separation module (11) as disclosed in Schell U.S. Pat. No. 4,134,742. The module comprises a multilayer membrane sheet (13) wound onto a hollow core member (15) having perforations (17). The multilayer membrane sheet (13) consists of two layers of cloth reinforced membrane (19) separated by a layer of tricot netting (21). Each layer of reinforced membrane (19) is covered by an exterior layer of vexar netting (23) on the opposite side of the membrane (19) from the tricot netting (21). In operation, a gas mixture is feed into the input end (25) of the spiral wound multilayer membrane sheet (13). The gas mixture spreads through the vexar netting (23), and the more permeable gas of the mixture penetrates the reinforced membrane (19) into the tricot netting layer (21). The tricot netting (21) conducts the selected gas spirally to perforations (17) of the hollow core member (15). The permeated gas then passes through the perforations (17) in the hollow core member (15) and can be removed through the permeate output (27) of the hollow core member (15). Non-permeable gas of the gas mixtures passes through the vexar netting (23) and exits through the residual output (29).

Figure 2:
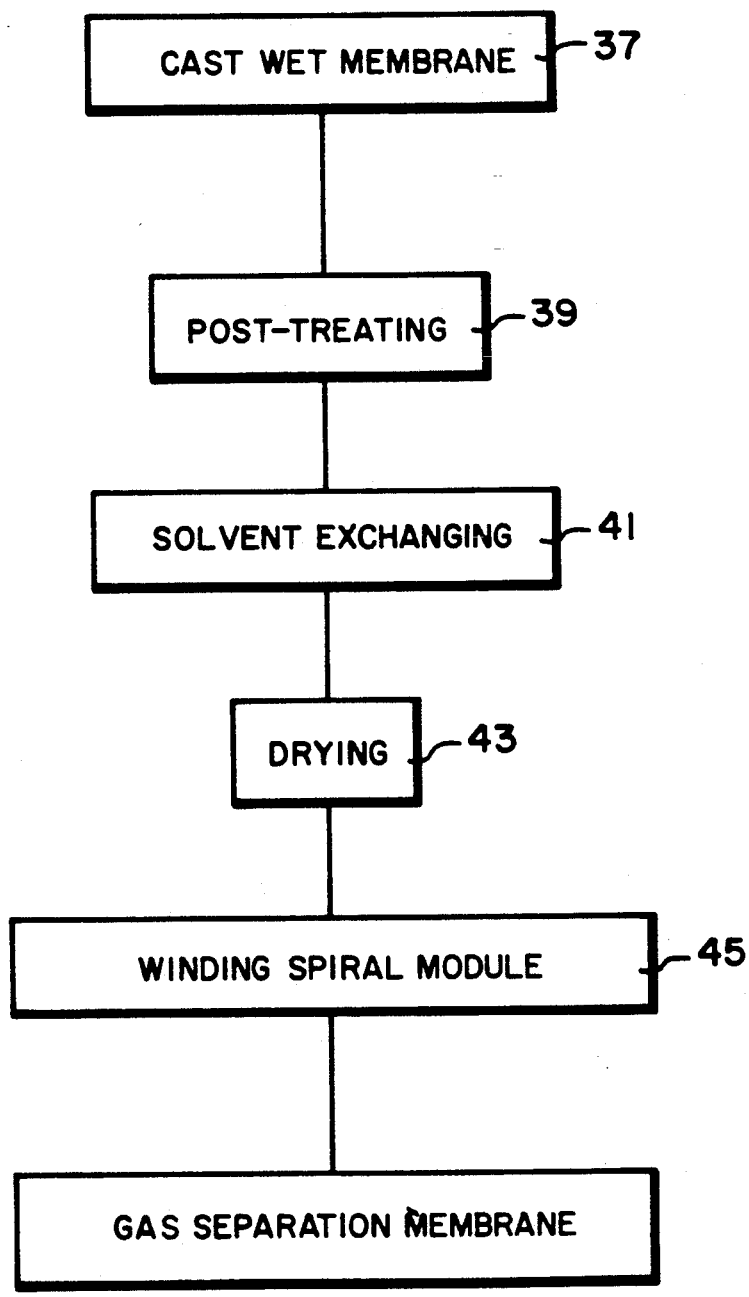
FIG. 2 is a flow chart of steps in a former process for producing spiralwound gas separation membranes and modules.

FIG. 2 shows a process (35) shown in Schell U.S. Pat. No. 4,134,742 for producing a spiral wound gas separation membrane as shown in FIG. 1. In a casting step (37) casting solution is cast onto a reinforcing fiber. In a post-treating step (39), the wet membrane is treated by gelling (immersing in a cold liquid), annealing (immersing in a hot liquid), or other treatment. In a solvent exchange step (41), one or more solvents replaces water absorbed in the membrane. In a drying step (43), the exchange solvent is dried from the membrane. In a winding step (45), the dried membrane is wound onto a core to produce a spiral wound module.

Figure 3:
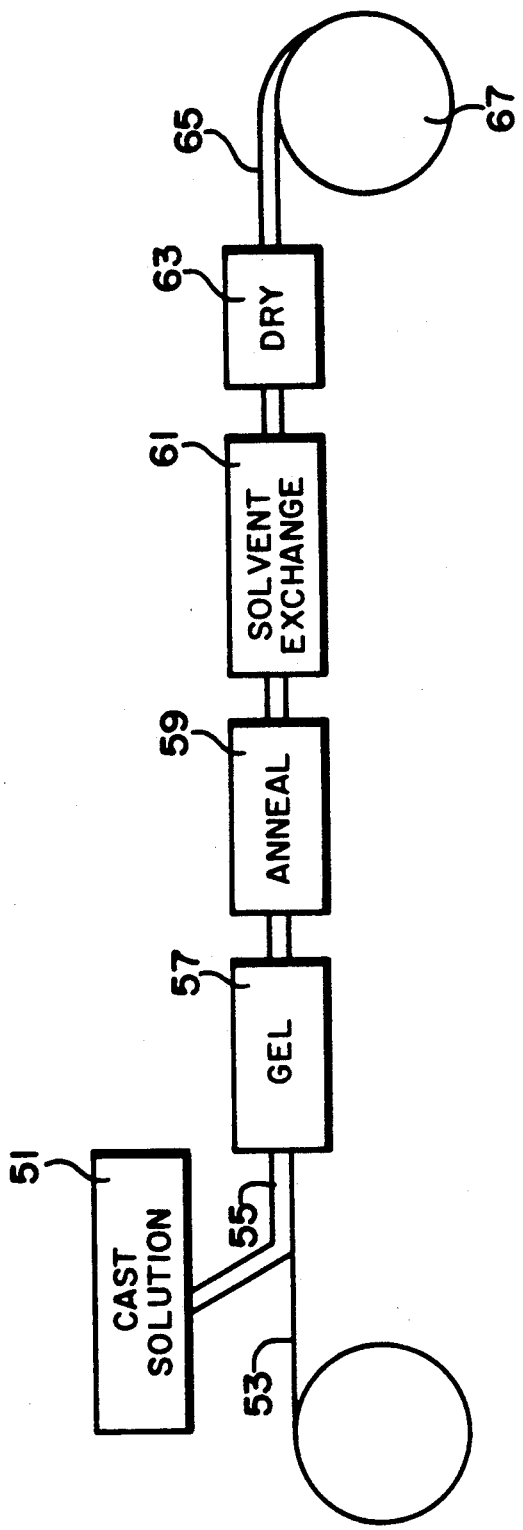
FIG. 3 is a schematic representation of an apparatus using the process of FIG. 2.

FIG. 3 shows an apparatus for forming a spiral wound gas separation module using the traditional process of FIG. 2. A casting solution (51) is cast onto a reinforcing fiber (53) to form a reinforced wet membrane (55). The reinforced wet membrane is immersed in a gelling tank (57) which contains cold water. The gelled membrane is then immersed in an annealing tank (59) containing hot water. The annealed membrane is then immersed in one or more solvent exchange tanks (61) which contain a series of exchange solvents. After solvent exchange, the membrane is dried in a drying apparatus (63) which may be a hot air blower. The dried membrane (65) is then wound onto a core to form a spiral wound module (67).

Figure 4:
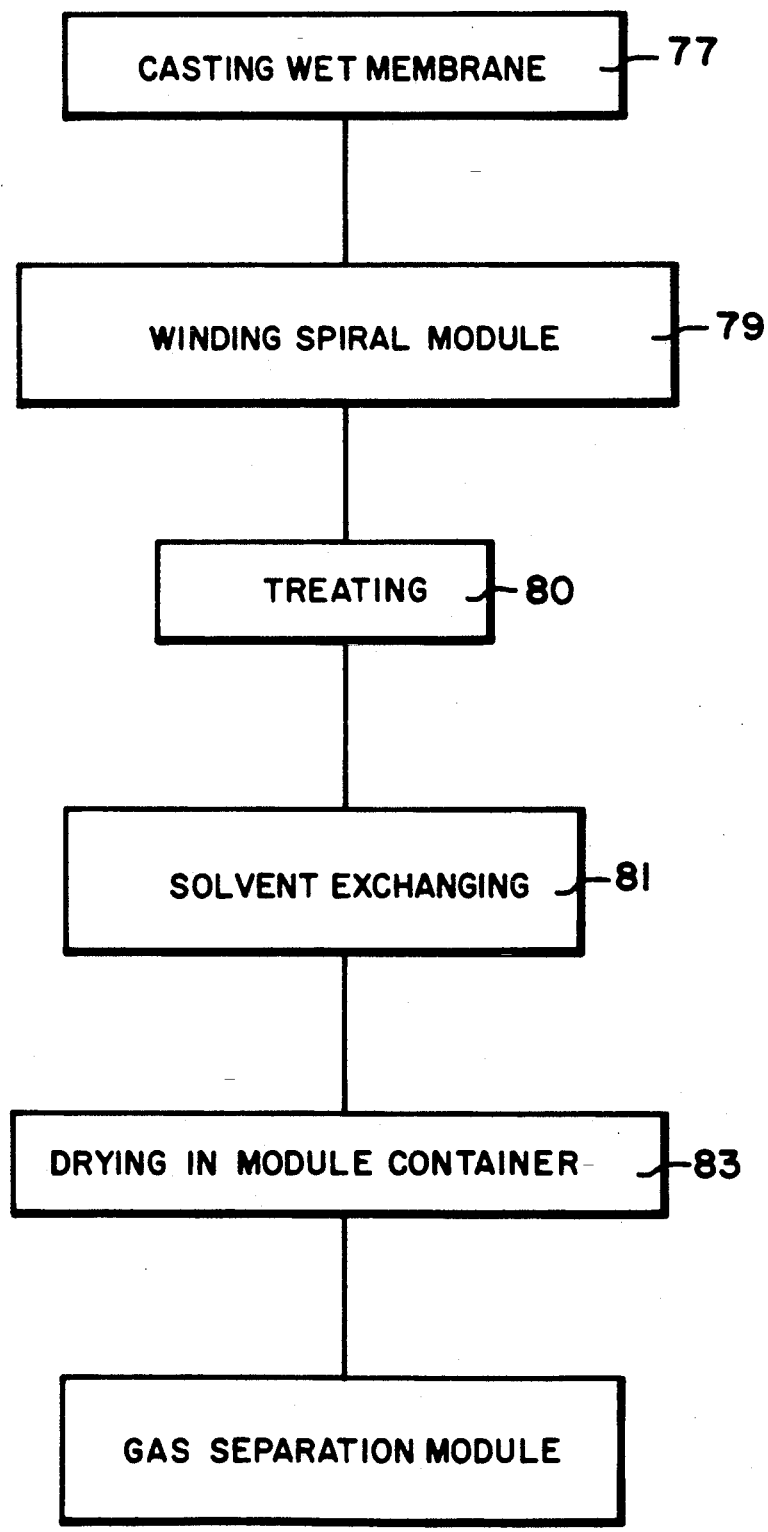
FIG. 4 is a flow chart of steps in a process for producing spiralwound gas separation membranes and modules embodying the present invention.
Figure 5:
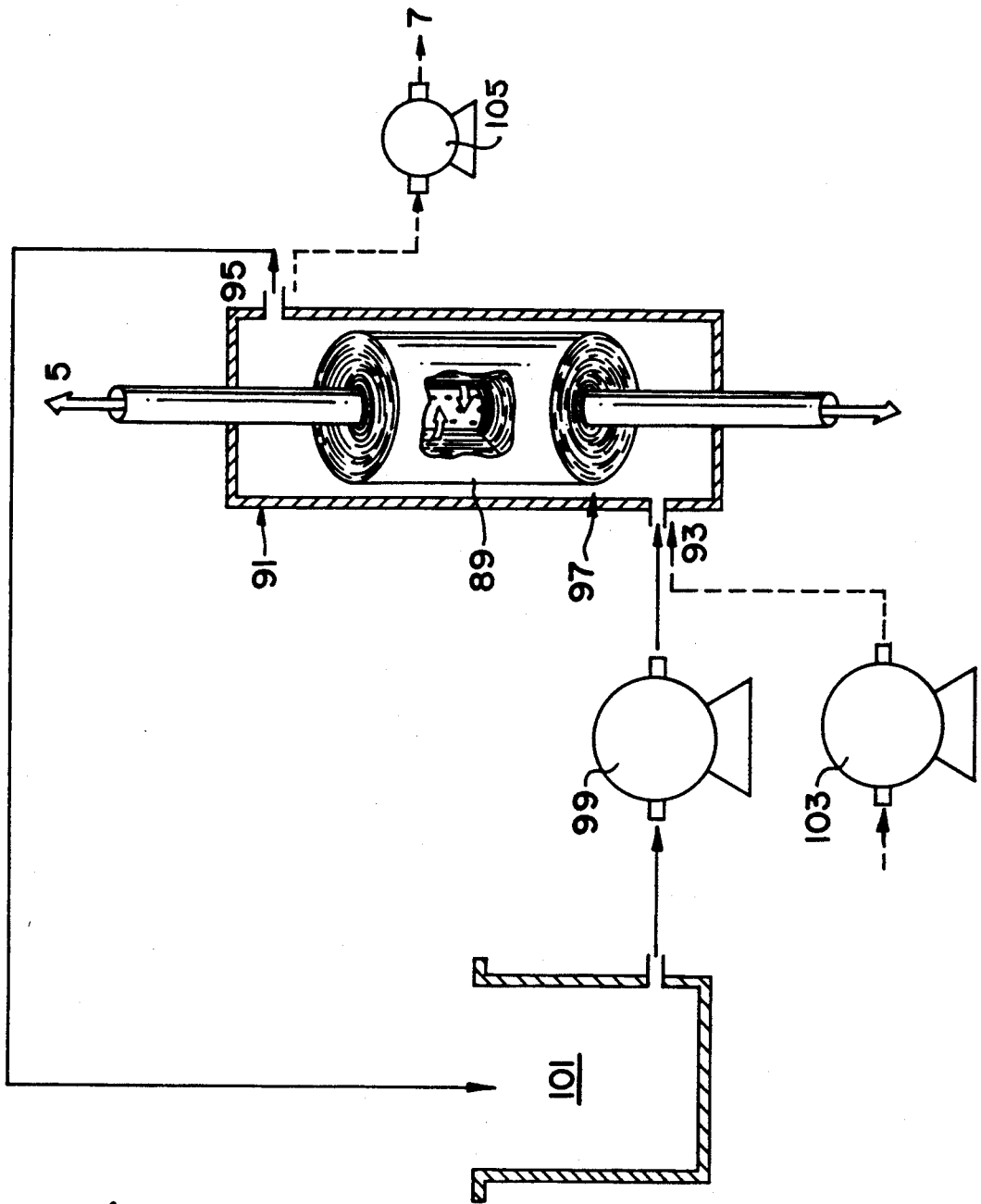
FIG. 5 is a schematic representation of an apparatus for treating and drying gas separation membrane modules in accordance with the present invention.

FIG. 4 depicts the steps of the process of the present invention in a flow chart form. In a casting step (77) casting solution is cast onto a reinforcing fiber. In a winding step (79) the fiber reinforced wet membrane is wound into a spiral module. In a treating step (80), treatment solutions may be circulated to anneal, repair or accomplish other changes to the particular membrane material used. In a solvent exchanging step (81) solvents replace water in the spiralwound module. Solvents are typically organic solvents. They can be miscible with water, but should not dissolve the membrane forming material. In a drying step (83) the solvents are evaporated to leave a dry membrane.

Figure 6:
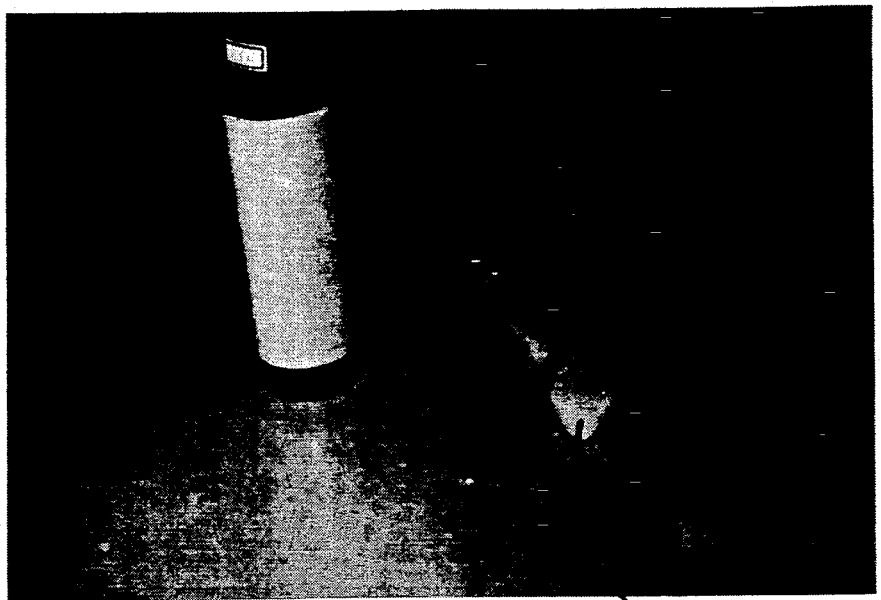
FIG. 6 is a photograph of a membrane cast on polyester cloth and held along one edge showing curling.

FIG. 6 depicts an apparatus for conducting solvent exchange and drying of the module. A spiral module (89) is placed in a container (91) having a fluid inlet (93) and a fluid outlet (95). An O-ring, or U-Cup (97) forms a seal between the module (89) and the container (91) so that any fluid passing from the container inlet (93) to the outlet (95) must pass through the spiral module (89). A circulating pump (99) transfers fluid from a reservoir (101) to the container inlet (93). Excess fluid exits the container (91) through the container outlet (95) and returns to the reservoir (101). After completing solvent exchange, the fluid pump (99) can be replaced with an air pump (103) and the container outlet (95) can be connected to a vacuum pump 105). The air pump 103) forces dry air into the container (91) and the vacuum pump (105) assists removal of air from the container through the container outlet (95). The vacuum pump (105) is optional. The reservoir (101) may contain multiple sections for storing different solvents. The reservoir may be temperature controlled, for example, to provide hot annealing water or a cold exchange solvent. The reservoir may hold a treating solution for modifying the surface properties of the membrane or repairing defects or pinholes in the membrane.

Membrane forming material may include natural macromolecules, such as natural gums, resins and high molecular polysaccharides (e.g., starch or cellulose). Membrane forming material may also include modified natural macromolecules, such as cellulose ether or cellulose ester.

The embodiments described below illustrate details of the present invention.

EMBODIMENT 1

A cellulose acetate cast solution made up of materials listed in the Table 1 was cast on a glass plate with a 10 mill doctor blade and allowed to gel for 10 to 15 minutes.

TABLE 1

| Cellulose Acetate (CA) Cast Solution Composition | |
|---|---|
| Components | Parts By Weight |
| Cellulose diacetate (CDA) | 8 g |
| Cellulose triacetate (CTA) | 8 g |
| Dioxane | 55 g |
| Acetone | 25 g |
| Methanol | 7 g |
| Maleic acid | 5 g |
| Acetic acid | 7 g |

The membrane was removed from the glass plate and annealed by emersion in 86° centigrade water. Annealed membrane was then immersed in isopropanol for 7 minutes, then in n-heptane for 7 minutes and then air dried at ambient room temperature. Polyester cloth was separately immersed in 86° centigrade water, immersed in isopropanol and n-heptane for 7 minutes each, and air dried in the same manner as the membrane. Shrinkage for both the membrane and the polyester cloth were measured and the results are tabulated in Table 2.

TABLE 2

| | Shrinkage Ratios | |
|---|---|---|
| Treatment | Length & Width (cm) | Shrinkage Ratio (%) |
| Unannealed wet membrane | 8 | — |
| Annealed wet membrane | 7.8 | −2.5 |
| Annealed dry membrane | 7.65 | −4.4 |
| Unannealed dry membrane | 7.57 | −5.4 |
| Unannealed polyester cloth | 10 | 0 |
| Annealed polyester cloth | 10 | 0 |
| Polyester cloth after solvent soaking, then drying | 10 | 0 |

Because of the high shrinkage difference between membrane and polyester cloth, membrane reinforced with polyester cloth would curl, especially during the drying step.

EMBODIMENT 2

The cellulose acetate solution of embodiment 1 was applied to polyester cloth with a 10 mill doctor blade, held for 5 to 10 seconds, then gelled in water at 1° centigrade for 5 to 15 minutes. The reinforced membrane was immersed in isopropanol at 3° centigrade for 7 minutes, then in n-heptane at 3° centigrade for 7 minutes. The reinforced membrane was fixed between two plates having a central hole so as to hold it around its periphery. A treating solution of 0.2% silicone and n-heptane was then poured onto the upper side of the reinforced membrane and a vacuum was applied to the lower side for 10 minutes. Application of the treating solution was stopped and vacuum held until the membrane dried completely. Gas permeation rates and selectivities of the dried membrane under 100 psi pure gas were measured and the results tabulated in Table 3.

TABLE 3

| Embodiment 2 Gas Permeation Rates and Selectivities |
|---|
| Gas Permeation Rates |
| $p/l\ (CO_2) = 1.60\ \text{to}\ 1.70 \times 10^{-4}\ cm^3/cm^2.S.cm\ Hg$ |
| $p/l\ (CH_4) = 4.24\ \text{to}\ 4.80 \times 10^{-6}\ cm^3/cm^2.S.cm\ Hg$ |
| $p/l\ (O_2) = 2.20\ \text{to}\ 2.73 \times 10^{-5}\ cm^3/cm^2.S.cm\ Hg$ |
| $p/l\ (N_2) = 4.35\ \text{to}\ 5.66 \times 10^{-6}\ cm^3/cm^2.S.cm\ Hg$ |
| Gas Selectivities |
| $\alpha\ (CO_2/CH_4) = 33\ \text{to}\ 40$ |

TABLE 3-continued

Embodiment 2 Gas Permeation Rates and Selectivities $\alpha$ ($O_2/N_2$) = 4.80 to 5.06

EMBODIMENT 3

A wet cast reinforced membrane identical to the one used in embodiment 2 was prepared in an identical manner, except that, soaking in isopropanol and n-heptane occurred at room temperature. Gas permeation rates and selectivities of the resultant dry membrane were measured and are tabulated in Table 4.

TABLE 4

Embodiment 3 Gas Permeation Rates and Selectivities

Gas Permeation Rates
p/1 ($CO_2$) = 2.31 to 3.13 $\times$ $10^{-4}$ $cm^3/cm^2$.S.cm Hg
p/1 ($CH_4$) = 7.46 to 10.8 $\times$ $10^{-6}$ $cm^3/cm^2$.S.cm Hg
p/1 ($O_2$) = 2.41 to 2.44 $\times$ $10^{-5}$ $cm^3/cm^2$.S.cm Hg
p/1 ($N_2$) = 4.97 to 5.00 $\times$ $10^{-6}$ $cm^3/cm^2$.S.cm Hg
Gas Selectivities
$\alpha$ ($CO_2/CH_4$) = 27 to 34
$\alpha$ ($O_2/N_2$) = 4.85 to 4.88

The results revealed that the membrane exhibits good performance even though solvent exchange occurred at room temperature.

EMBODIMENT 4

A cast solution made up of materials listed in Table 5 was cast on polyester cloth with a 10 mill doctor blade, then gelled in 20° centigrade water for 10 to 20 minutes.

TABLE 5

Polysulfone Cast Solution

| Material | Amount |
|---|---|
| P-3500 | 35 g |
| NMP (N-methyl pyrrolidone) | 80 g |
| THF (Tetrahydrofuran) | 80 g |
| PG (propylene glycol) | 10 g |

The reinforced membrane was fixed between two plates having central holes so as to hold it around its periphery and dried at 30° centigrade, 50% relative humidity for 24 hours. A 0.5% silicone solution in n-heptane was poured on the dry membrane while applying the vacuum on the lower side for 1 minute. The solution was stopped and vacuum applied until the membrane dried completely. Gas permeation rates and selectivities were measured, and the results are tabulated in Table 6.

TABLE 6

Embodiment 4 Gas Permeation Rates and Selectivities

Gas Permeation Rates
p/1 ($CO_2$) = 7.20 $\times$ $10^{-5}$ $cm^3/cm^2$.S.cm Hg
p/1 ($CH_4$) = 4.6 $\times$ $10^{-6}$ $cm^3/cm^2$.cm Hg
p/1 ($O_2$) = 1.8 $\times$ $10^{-5}$ $cm^3/cm^2$.S.cm Hg
p/1 ($N_2$) = 4.1 $\times$ $10^{-6}$ $cm^3/cm^2$.S.cm Hg
Gas Selectivities
$\alpha$ ($CO_2/CH_4$) = 15.68
$\alpha$ ($O_2/N_2$) = 4.39

EMBODIMENT 5

Figure 7:
FIG. 7 is a photograph of the membrane of FIG. 6 in its natural state (not held along one edge) showing curling.

The cast solution of embodiment 2 was cast on polyester cloth and held for 5 to 10 seconds. The reinforced membrane was then gelled at 1° centigrade for 5 to 15 minutes. The membrane was then heat annealed at 89° centigrade for 5 minutes, after which it was immersed in isopropanol at 3° centigrade for 7 minutes and n-heptane at 3° centigrade for 7 minutes. The membrane was air dried at ambient temperature, and observation showed severe curling as illustrated in FIGS. 6 and 7. FIG. 6 shows the sample "5" held along one edge. FIG. 7 shows the sample "5" in its natural state (not held along an edge). Gas permeation rates and selectivities were measured and the results are tabulated in Table 7.

TABLE 7

Embodiment 5 Gas Permeation Rates and Selectivities

Gas Permeation Rates
p/1 ($CO_2$) = 3.8 $\times$ $10^{-4}$ to 5.1 $\times$ $10^{-4}$ $cm^3/cm^2$.S.cm Hg
p/1 ($CH_4$) = 1.7 $\times$ $10^{-5}$ to 2.5 $\times$ $10^{-5}$ $cm^3/cm^2$.S.cm Hg
Gas Selectivities
$\alpha$ ($CO_2/CH_4$) = 20 to 27

This data reveals that cracking and curling causes lower selectivity.

EMBODIMENT 6

A 40 inch wide membrane was prepared by continuous type membrane coating and wound into a 4 inch by 40 inch spiral module. The module was placed in a container as shown in FIG. 6. Isopropanol was circulated for 1 day, then n-heptane for 1 day, then a 0.1% silicone solution in n-heptane for 1 day. Excess solution was decanted from the container, and the module was purged with dry air from the container inlet while applying vacuum to the container outlet. Gas permeation rates and selectivities of the dried module were measured under 100 psi pure gas, and the results are tabulated in Table 8.

TABLE 8

Embodiment 6 Gas Permeation Rates and Selectivities

Gas Permeation Rate
p/1 ($CO_2$) = 415 NL/min
p/1 ($O_2$) = 47 NL/min
p/1 ($N_2$) = 8.4 NL/min
p/1 ($CH_4$) = 10.7 NL/min
Gas Selectivities
$\alpha$ ($CO_2/CH_4$) = 38.8
$\alpha$ ($O_2/N_2$) = 5.6

COMPARATIVE EXAMPLE

Two 2 inch by 12 inch annealed gas separation modules were prepared following the traditional procedure. The selectivities of each membrane to nitrogen and oxygen were measured and the results shown in the first two lines (samples 1 and 2) of the Table 9. Two 2 inch by 12 inch unannealed gas separation modules were then prepared by winding wet membrane into a spiral module, conducting solvent exchange and drying. The selectivities of these membranes to nitrogen and oxygen are shown in the bottom two lines (samples 3 and 4) of Table 9.

TABLE 9

Comparative Results

| Method | Traditional | The Instant Invention |
|---|---|---|
| $\alpha$ ($O_2/N_2$) of sample (1) | 4.7 | |
| $\alpha$ ($O_2/N_2$) of sample (2) | 3.0 | |
| $\alpha$ ($O_2/N_2$) of sample (3) | | 4.8 |

TABLE 9-continued

| Method | Comparative Results | |
|---|---|---|
| | Traditional | The Instant Invention |
| α (O$_2$/N$_2$) of sample (4) | | 5.2 |

The low performance module of sample (2) (prepared by the traditional method) was dissected and found to have many scratches on the membrane surface. Table 10 shows gas permeation rates for oxygen and nitrogen (p/1 (O$_2$) and p/1 (N$_2$) respectively) and gas selectively (α(O$_2$/N$_2$)) for five scratched areas from that sample.

TABLE 10

Permeation Rates and Selectivities of Sample (2) Membrane

| Sample No. | 1 | 2 | 3 | 4 | 5 |
|---|---|---|---|---|---|
| p/1 (O$_2$) | $1.76 \times 10^{-5}$ | $2.01 \times 10^{-5}$ | $2.12 \times 10^{-5}$ | $8.12 \times 10^{-5}$ | $3.68 \times 10^{-5}$ |
| p/1 (N$_2$) | $3.51 \times 10^{-6}$ | $4.04 \times 10^{-6}$ | $4.15 \times 10^{-6}$ | $4.34 \times 10^{-5}$ | $9.53 \times 10^{-6}$ |
| α (O$_2$/N$_2$) | 5.01 | 4.98 | 5.11 | 1.87 | 3.86 |

Note: Unit of p/1 is cm$^3$/cm$^2 \cdot$ S $\cdot$ cm Hg.

It is to be realized that only preferred embodiments of the invention have been described and that numerous substitutions, modifications and alterations are permissible without departing from the spirit and scope of the invention as defined in the following claims.

What is claimed is:

1. A process for preparing membrane consisting essentially of the steps of:
    casting a solution of membrane-forming material onto a reinforcing fabric to form a wet membrane sheet,
    winding the wet membrane sheet into a spiral module;
    arranging the wound module in a treating apparatus,
    circulating a treating solution through the module in the treating apparatus for an appropriate period of time, and purging the module until the membrane is dry.

2. A process in accordance with claim 1, wherein the membrane forming material comprises a combination of organic and inorganic materials.

3. A process in accordance with claim 1, wherein the organic membrane forming material comprises a natural macromolecule, or modified natural macromolecule.

4. A process in accordance with claim 1 wherein the organic membrane forming material comprises a synthetic polymer.

5. A process in accordance with claim 1, wherein the organic membrane-forming material comprises one of cellulose acetate, polysulfone, polyamide, polyimide, polycarbonate, polysiloxane, poly(4-methylpentene), poly(phenylene oxide), and poly(vinylidene fluoride).

6. A process in accordance with claim 1, wherein the treating apparatus comprises:
    a closed container having a container inlet and a container outlet, and
    a seal disposed within the container, so that when the spiral module is disposed within the treating apparatus, fluid pumped into the inlet passes through the module to the outlet.

7. A process in accordance with claim 1, wherein the treating solution comprises a solution of macromolecules material.

8. A process in accordance with claim 1, wherein the treating solution comprises an organic solvent.

9. A process in accordance with claim 1, wherein the treating solution comprises silicone.

10. A process in accordance with claim 1, wherein the period of circulation of each treating fluid is in the range of 1 minute to 48 hours.

11. A process in accordance with claim 1, wherein the period of circulation of the treating fluid is in the range of 1 hour to 24 hours.

12. A process in accordance with claim 1, wherein the period of circulation of the treating fluid is in the range of 11 hours to 13 hours.

13. A process in accordance with claim 1, wherein the container is purged with air.

14. A process in accordance with claim 1, wherein the container is purged with inert gas.

15. A process in accordance with claim 1, wherein the membrane is comprised of a material having different permeation rates to different gases, thereby functioning as a gas separation membrane.

16. A process for preparing spiralwound gas separation modules, consisting essentially of the steps of:
    casting a solution of membrane-forming material into a wet membrane,
    winding the wet membrane into a spiral module,
    arranging the spiral module in a uni-direction flow treating container,
    circulating a treating solution for an appropriate period of time through the module and container, and
    purging the module and container until the membrane is completely dry.

17. A process in accordance with claim 16, wherein the membrane forming material comprises a combination of organic and inorganic materials.

18. A process in accordance with claim 16, wherein the organic membrane forming material comprises natural macromolecules or modified natural macromolecules.

19. A process in accordance with claim 16, wherein the organic membrane forming materials comprise a synthetic polymer.

20. A process in accordance with claim 16, wherein said organic membrane forming material comprises one of cellulose acetate, polysulfone, polyamide, polyimide, polycarbonate, polysiloxane, poly(4-methyl-1-pentene), poly(phenylene oxide), and poly(vinylidene fluoride).

21. A process in accordance with claim 16, wherein the treating solution comprises a solution of a macromolecule material.

22. A process in accordance with claim 16, wherein the treating solution comprises an organic solvent.

23. A process in accordance with claim 16, wherein the treating solution comprises one of n-heptane, isopropanol, and silicone.

24. A process for preparing composite membrane consisting essentially of the steps of:
    casting a solution of organic and inorganic membrane-forming material into wet membrane on a reinforcing substrate,
    winding the reinforced wet membrane into a spiral module, arranging the module in a unidirectional-flow treating container, circulating a treating solution for an appropriate period of time through the module, and purging the module and container with gas until the module is dry.

25. A process in accordance with claim 24, wherein the organic membrane-forming material comprises natural macromolecules or modified natural macromolecules.

26. A process in accordance with claim 24, wherein the organic membrane-forming material comprises a synthetic polymer.

27. A process in accordance with claim 24, wherein the organic membrane-forming material comprises one of cellulose acetate, polysulfone, polyamide, polyimide, polycarbonate polysiloxane, poly(4-methyl-1-pentene), poly(phenylene oxide), and poly(vinylidene fluoride).

28. A process in accordance with claim 24, wherein the membrane comprises a single layer of membrane material.

29. A process in accordance with claim 24, wherein the module comprises multiple layers of membrane material.

30. A process in accordance with claim 24, wherein the treating solution comprises a solution of membrane forming material used for coating the membrane.

31. A process in accordance with claim 24, wherein the treating solution comprises an organic solvent.

32. A process in accordance with claim 24, wherein the treating solution comprises one of n-heptane, isopropanol, and silicone.

* * * * *